(12) United States Patent
Gnanasekaran (10) Patent No.: US 11,934,499 B2
(45) Date of Patent: Mar. 19, 2024

(54) CONTACT LOOKUP OPERATIONS DURING INOPERABILITY OF MOBILE DEVICES

(71) Applicant: PAYPAL, INC., San Jose, CA (US)

(72) Inventor: Venkatesh Gnanasekaran, Cupertino, CA (US)

(73) Assignee: PAYPAL, INC., San Jose, CA (US)

( * ) Notice: Subject to any disclaimer, the term of this patent is extended or adjusted under 35 U.S.C. 154(b) by 366 days.

(21) Appl. No.: 17/307,867

(22) Filed: May 4, 2021

(65) Prior Publication Data

US 2022/0358194 A1 Nov. 10, 2022

(51) Int. Cl.
*G06F 21/31* (2013.01)
*H04L 9/40* (2022.01)
*H04M 3/493* (2006.01)

(52) U.S. Cl.
CPC ........ *G06F 21/313* (2013.01); *H04L 63/0861* (2013.01); *H04M 3/493* (2013.01); *G06F 2221/2103* (2013.01); *H04M 2203/60* (2013.01)

(58) Field of Classification Search
CPC ........... G06F 21/313; G06F 2221/2103; H04L 63/0861; H04M 3/493; H04M 2203/60
See application file for complete search history.

(56) References Cited

U.S. PATENT DOCUMENTS

| | | | |
|---|---|---|---|
| 8,447,691 B2* | 5/2013 | Kwong Hin Sang | G06Q 20/10 705/42 |
| 9,424,412 B1* | 8/2016 | Pender | H04W 12/06 |
| 10,467,426 B1* | 11/2019 | Esposito | G06F 16/24564 |
| 10,931,821 B2* | 2/2021 | Sanderlin | H04M 3/493 |
| 11,336,682 B2* | 5/2022 | Keret | H04L 63/1433 |
| 11,627,054 B1* | 4/2023 | Esposito | H04L 41/28 709/225 |

* cited by examiner

*Primary Examiner* — Hosuk Song
(74) *Attorney, Agent, or Firm* — Haynes and Boone, LLP (57) ABSTRACT

There are provided systems and methods for contact lookup operations during inoperability of mobile devices. A service provider, such as an online transaction processor, may provide additional services for secure contact lookup when a computing device of a user is nonoperational or unavailable. The user may establish a contact identifier and authentication mechanism with the service provider and allow access to the user's contacts. Once established, when the user's device is unable to access contacts and/or communication with other devices, the user may utilize the service provider for contact access through a contact lookup system. The user may utilize a different device to access a communication system or application and retrieve a data structure representing the user's contacts. The data structure may then be passed to the corresponding communication system or application interface system, which may then be output to the user.

20 Claims, 6 Drawing Sheets

CONTACT LOOKUP OPERATIONS DURING INOPERABILITY OF MOBILE DEVICES

TECHNICAL FIELD

The present application generally relates to secure automated systems for data searching, and more particularly to providing a service provider system that is securely accessible from a foreign device to retrieve contact information.

BACKGROUND

Users may utilize various mobile computing devices, such as tablet computers, smart phones, and wearable computing devices, to perform computing operations and communications. For example, during everyday activities, users may encounter various occurrences where the users communicate with other users via devices, such as phone calls and text messages with friends, family members, and the like. However, mobile computing devices that utilize batteries may become at risk of failure. For example, heavy use of a mobile device may drain a battery and cause the mobile device to fail. Mobile devices are also at risk of theft or damage, which may be especially likely at certain locations and/or under certain conditions. When such situations occur, the users may be left without device functionality to contact another user to request assistance. With the increased use of smart phones, users rarely input a phone number or other contact identifier to contact other users, including friends, family, and other commonly contacted users. Instead, users normally utilize a name or nickname within a contact list that is stored by their device. Thus, it is desirable to provide a secure system that provides device redundancy for retrieving contact identifiers when mobile devices become nonoperational or unavailable.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for contact lookup operations during inoperability of mobile devices. Systems suitable for practicing methods of the present disclosure are also provided.

An online service provider, such as an online platform providing one or more services to users and groups of users, may provide a platform that allows a user to register a set of contacts for a user to access via an interactive voice response (IVR) system, accessible website, and/or secure mobile application login. The service provider may allow the user to register an account and/or a contact identifier associated with the user and/or their computing device with the service provider. The contact identifier may correspond to a phone number known to the user, such as a mobile, home, or work number that the user may have memorized. Thereafter, the user may further establish an identity challenge, access code, password, or another authentication mechanism. This authentication mechanism may be one that the user further can memorize or always has available, such as a biometric, wearable computing device, keyfob device, contactless card chip, or the like.

Once the contact identifier and the authentication mechanism are registered, the user may then set one or more contacts for retrieval by the service provider when the contact identifier and authentication mechanism are entered by another, foreign device. A "foreign" device, as used herein, may be a device that does not include contacts associated with the user requesting the foreign device's use, or may be any device that is not recognizable as the user's device, including public phone, pay phones, and the like. In this regard, when the user's main and/or known device(s) fail, the user may utilize a foreign device of another user (e.g., a friend, coworker, another nearby user providing assistance, an authority or healthcare worker, etc.). As used herein, "known" device refers to a device that the user is in possession of at least a portion of the time and has contacts stored to the device. The user may utilize the foreign device to call a known number or utilize an application to contact the service provider. Thereafter, the user may enter in a contact identifier, such as the user's personal phone number established with the account, and the requisite authentication information for the authentication mechanism. The service provider may then respond with access to the user's contacts. The user may also be provided with services to call or communicate with one or more of the contacts, and after use of the foreign device is completed, any data associated with the call or use on the foreign device may be removed and/or scrubbed to prevent misuse.

In order to provide these services, an online service provider (e.g., an online transaction processor, such as PAYPAL®) may provide account services to users of the online service provider, as well as other entities requesting additional services. A user wishing to establish the account may first access the online service provider and request establishment of an account. An account and/or corresponding authentication information with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments. This information may be used to process transactions for items and/or services including providing compensation to others for use of their devices with the contact lookup operations of the service provider. In some embodiments, the account creation may be used to establish account funds and/or values, such as by transferring money into the account and/or establishing a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PAYPAL® or other online payment provider, may provide payments and the other transaction processing services. However, other service providers may also provide the computing services discussed herein, such as telecommunication service providers.

Once the account of the user is established with the service provider, the user may utilize the account via one or more computing devices, such as a personal computer, tablet computer, mobile smart phone, or the like. The user may engage in one or more online or virtual interactions that may be associated with electronic transaction processing, images, music, media content and/or streaming, video games, documents, social networking, media data sharing, microblogging, and the like. This may cause depletion of mobile device resources (e.g., battery, mobile data accessibility for a data plan, etc.) and inoperability of the device. Further, mobile devices are prone to theft, loss, and damage. Thus, the user may utilize a secure contact lookup service of the service provider to first register a contact identifier the user would like to utilize when their computing device is inoperable or otherwise inaccessible (e.g., stolen or lost). The contact identifier may include a phone number of the mobile device, account identifier, email, name, address, or other information that the user may easily recall. The user may then receive an identity challenge that the user must pass. In some embodiments, this may correspond to an authentication mechanism, such as a password, access code, PIN, biometric fingerprint, voice response, facial recognition, or the like, which requires corresponding authentication information that the user has set. However, the identity challenge may be other information, such as a security question, request for a phrase or name, or the like, which the user may easily recall. In some embodiments, the service provider may not require the account and the contact identifier selected by the user and authentication mechanism may be sufficient for secure contact lookup services. For example, where the authentication mechanism is facial recognition and/or a fingerprint, the authentication information may be sufficient to identify the account and/or contacts of the user.

The user may then provide contacts to the service provider for storage with the account and association with the contact identifier when the contact identifier is used. The contacts may be manually entered, such as using an IVR system through keypad entry or voice input, through keyboard or touchscreen entry, or other input mechanism. Utilizing a website of the service provider, the user may similarly provide input through a keyboard, touch screen, voice, or other input mechanism, as well as uploading a contact list from a file or contact list application. This may include providing a rich Internet application access to local files or data for contact list uploading. Further, if a software application is used for registration, such as a resident mobile application, permissions may be provided for the application to access and upload the contacts of the user.

The user may allow the service provider to copy and/or image at least a part of their computing device including a contact application, which may be stored in a data container for use. In some embodiments, an entire system image of a computing device may be provided, which may allow the service provider to provide the system image on another computing device for access to additional applications. When uploading the contacts, the user may provide all contacts, or may select a subset of contacts, such as essential contacts to the user. Further, the service provider may automatically group essential contacts based on use or knowledge of the contacts (e.g., contacts labeled or identified as "wife," "mother," "employer," "emergency contact," or the like), as well as based on a recency of use, which may be maintained and periodically updated. The user may also choose an order and/or additional identifiers for the contacts specifically with the contact lookup and search system. For example, when ordering the contacts, a most important contact for nonoperation of a computing device may be selected first and proceed down a list or ranking of importance or availability. Different identifiers may allow for shortcuts and quick retrieval of certain contacts, which may be useful with an IVR system (e.g., use "111" for an emergency contact).

In some embodiments, the service provider may also trace the contacts from one or more external or third-party contact applications, tools, and/or contact lists. For example, GOOGLE CONTACTS® may provide a contact management tool that maintains a contact list for different users. The service provider may utilize one or more application programming interfaces (APIs) to trace the user's contacts to such a contact list platform and perform one or more API calls to request and retrieve the user's contacts. The user may be required to authorize permission to the contacts. API integrations between the platforms and systems may allow for API calls and requests to be executed to track, request, and/or receive data from different platforms and operations of the different service provider. In this regard, the API integrations may allow auto-authentication or permission requests to share contacts during setup of the user's account and/or contact identifier with the contact lookup system. The user may then be able to utilize all contacts or select a subset of the contacts for the service provider's contact lookup system. When adding contacts, the user may provide different contact pathways, communication channels, and/or contact identifiers for the contacts of the user. For example, the user may select from a phone, email, messenger name, social networking name or identifier, account identifier, and the like for their contacts, which may provide redundancy for different communication pathways.

Once established, the user's device may become inaccessible or inoperable, such as due to theft, loss, damage, loss of battery, and the like. If the user is in need of assistance, the user may then utilize the service provider's contact lookup system to communicate with the service provider and access their contacts. This may be especially beneficial where the user does not recall their contacts' identifiers, such as personal phone numbers, email addresses, or the like. Further, the user may utilize multiple different communication channels and systems to retrieve their contacts, adding flexibility to the type of device used to communicate with the service provider. In some embodiments, the user may utilize an IVR system to communicate with the service provider, which may be particularly useful if the user utilizes a public phone, a landline phone, or a feature phone without a touch screen interface and/or keyboard. The IVR system may allow the user to enter input via typing on a phone keypad and/or through voice inputs. Further, the IVR system may be directly accessible through a phone number. The phone number may be a service or help line of the service provider and associated with the IVR system and/or contact lookup system, or the phone number may be the user's own phone number. When using the user's own phone number, the user may be required to enter a key or code at some point during the call, such as when reaching voicemail, which may cause the call to flip to the IVR system.

When using the IVR system from a public or foreign phone, the user may then be required to authenticate their identity using the identity challenge or another authentication mechanism. The authentication mechanism may be played or output to the user, where the user may respond with an access code and/or voice response for voice recognition and identification. In some embodiments where the phone or device has biometric or other data capture capabilities, other user data may be captured, converted, and provided during the phone call to the IVR system, such as by converting aa fingerprint biometric to data capable of being transmitted during a phone call. However, if the device is a public or feature phone and does not have such capabilities required by the authentication mechanism, the IVR system may identify that the biometric or other authentication information cannot be entered and may switch or default to an authentication mechanism capable of being entered via the device, such as an access code. Similarly, if the user enters a voice input, but it cannot be understood or deciphered (e.g., when at a loud public place, such as an airport), the IVR system may similarly default to a different authentication mechanism that may be more easily understood and deciphered.

Other communication channels that the user may utilize include a mobile application on another user's foreign device, as well as a similar rich Internet application and/or website on the other user's device. For example, the user that has lost access to their device or their device is no longer functional may request use of a mobile computing device from a nearby user. The user may also access a public computing device or terminal. The user may then utilize this device to open an application associated with the service provider and/or access a website of the service provider (which may also provide the rich Internet application). The user may then enter an authentication and/or processing flow that allows the user to enter their phone number or other contact identifier and authenticate their identity through the use of the established authentication mechanism. The user may provide an access code, password, voice sample or input, fingerprint or other biometric, facial image for facial recognition, or the like. The service provider may then authenticate the user and retrieve the contacts. Prior to this and/or once entering the authentication flow for the contact lookup operations, the other user's device may further enter into a secure mode whereby the borrowing user (whose device is unavailable for use) is unable to utilize other functionality on the foreign device and the contact data of the borrowing user is inaccessible to operations of the foreign device. Thus, the borrowing user may be provided limited functionality on the other user's device. This may continue while the borrowing user is facially recognized, their biometric is periodically input, and/or the borrowing user is still logged in to the device.

Thereafter, the user may access their contacts from the device. When using an IVR system, the IVR system may automatically read back (e.g., by audio output) one or more contact identifiers for the contacts stored by the user with the contact lookup system. The IVR system may proceed through an order established by the user, may read back based on importance, or may determine and provide a most recent contact. The user may also search through inputs via a phone keypad, touch screen, or the like. For example, the user may utilize a phone keypad to enter letters for a name or an alphanumeric code set for a particular contact (e.g., "111" being an emergency contact). The user may also utilize voice input to select a contact, such as by stating a name or other identifier for the contact. In some embodiments, the IVR system may also allow the user to automatically be connected to a phone number of a contact selected.

When utilizing an application or website, the user may receive the contacts as a visual output, as well as an audio output in some embodiments. The user may be able to scroll through the contacts, as well as search the contacts using names, identifiers, keywords, recency, contact frequency, and the like. The contacts may be output based on contacts uploaded and stored by the contact lookup system. However, in other embodiments, an image of the application and/or system, stored in a container for the user with the contact lookup system, may be used to run an image of a contact list within a contact list application, which may display the contacts and allow the user to view and select contacts for additional information. In some embodiments, the user may utilize the foreign device to communicate with one of the contacts directly. For example, the user may call via a phone line, which may be provided by the foreign device or through a Voice over IP (VoIP) or Voice over LTE (VoLTE) line provided by service provider. Further, the user may utilize other communication channels, such as text, email, and the like, which may allow the user to communicate with a contact using the foreign device or routed through the service provider.

In some embodiments, when using the foreign device, a system or application image of the user's mobile computing device may allow the service provider to run an application and operation of the user's device on the foreign device. For example, a virtual machine may be used to run an image from a container storing the system image with the service provider. The image may allow the user to utilize a contact list application and/or other application, such as a transaction processing application. Once the user is finished using the contact lookup system and operations on the foreign device, the user may logout, hang up, and/or hand the foreign device back to the original owner. The foreign device and/or service provider may detect the logout or discontinuation of use and may wipe data from the foreign device that was used during the contact lookup operations. For example, the foreign device may be scrubbed of all data related to any contacts and/or contact lookup, as well as the contact identifier and authentication information used to access the contact lookup system. Other data associated with the user may also be deleted, such as text messages, cookies, voice messages, and the like. Once the borrowing user retrieves their device or restores device functionality, the borrowing user may be permitted to contact and/or provide compensation (e.g., a tip) to the user that lent their device to the borrowing user. This may also include providing any compensation for data usage on the lending user's device, such as if an international call was required.

Figure 1:
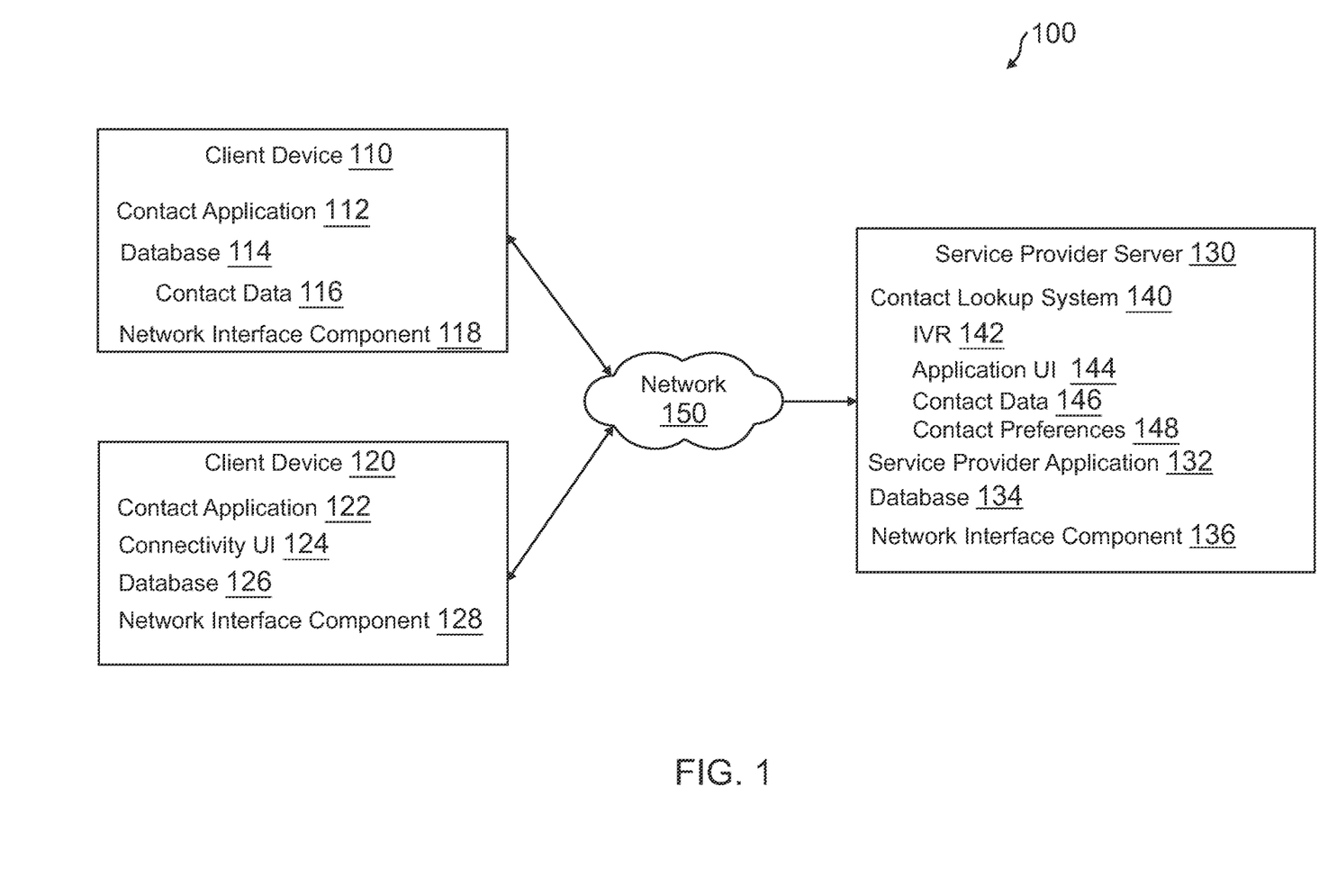
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers, may be combined or separated for a given embodiment and may be performed by a greater number or fewer number of devices and/or servers. One or more devices and/or servers may be operated and/or maintained by the same or different entities.

System 100 includes a client device 110, a client device 120, and a service provider server 130 in communication over a network 150. Client device 110 may be used to establish an account or contact identifier with service provider server 130, which may include contacts and contact information of a first user associated with client device 110, using processing operations of service provider server 130. Client device 110 may become nonoperational or inaccessible, at which point the first user may request usage of client device 120 (e.g., from a second user or via a publicly accessible phone or computing terminal) in order to recover one or more contacts from service provider server 130. Service provider server 130 may authenticate the first user once identified through one or more authentication mechanisms, and thereafter, output one or more contact identifiers to the first user via client device 120.

Client device 110, client device 120, and service provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Client device 110 may be implemented using any appropriate hardware and software configured for wired and/or wireless communication with client device 120 and/or service provider server 130 for data communications, which may be utilized to establish contacts for lookup with service provider system 130 when client device 110 is nonoperational or inaccessible. Client device 110 may correspond to an individual user, consumer, or merchant that utilizes a platform provided by service provider server 130 to lookup established contacts. In various embodiments, client device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

Client device 110 of FIG. 1 contains a contact application 112, a database 114, and a network interface component 118. Contact application 112 may correspond to executable processes, procedures, and/or applications with associated hardware. In other embodiments, client device 110 may include additional or different software as required.

Contact application 112 may correspond to one or more processes to execute modules and associated devices of client device 110 to provide a convenient interface to permit a user for client device 110 to enter, view, and/or provide information for an account or contact identifier setup with contact lookup operations for service provider server 130. In this regard, contact application 112 may correspond to specialized hardware and/or software utilized by client device 110 that may first access a website, portal, or application interface associated with service provider server 130 for account setup and/or contact identifier establishment in order to associate contacts with an identifier for later retrieval. In various embodiments, contact application 112 may correspond to a general browser application configured to retrieve, present, and communicate information over the Internet (e.g., utilize resources on the World Wide Web) or a private network. For example, contact application 112 may provide a web browser, which may send and receive information over network 150, including retrieving website information, presenting the website information to the user, and/or communicating information to the website. However, in other embodiments, contact application 112 may include a dedicated application of service provider server 130 or other entity, which may be configured to assist in establishing contacts with service provider server for retrieval using a contact identifier when client device 110 becomes nonoperational or inaccessible.

Contact application 112 may be used to establish the account by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. Contact application 112 may also provide financial information, including payment card (e.g., credit/debit card) information, bank account information, gift card information, benefits/incentives, and/or financial investments for the account, which may be utilized to provide compensation, tips, and the like after utilizing client device 120 (e.g., when client device 110 is recovered, resumes operation, or another device is used). Thus, the financial information and/or digital wallet may be used for transaction processing, transfers, and the like. In some embodiments, an account is not required, and instead a contact identifier, such as a phone number, email address, name, address, or the like is instead provided. Contact application 112 may also be used to select an authentication mechanism and corresponding authentication information required to access the user's contacts from client device 120 or another device.

Client device 110 may then be used to provide contacts to service provider server 130. In some embodiments, the contacts may be provided by uploading, sharing, and/or providing permissions to contact data 116 in database 114. In some embodiments, sharing of contact data 116 may include providing an application or system image that includes contact data 116. In further embodiments, contacts may be provided through direct input. Contact application 112 may also be used to provide a permission for service provider server 130 to access contact data 116 and/or contact lists from a third-party source, such as a contact management and/or contact list application or tool with another platform. Contact data 116 or other contact input may initially be provided during a setup, and preferences (e.g., an order, list, selected contacts, etc.) may then be set for the established contacts with service provider server 130. Thereafter, when client device 110 is online and/or by request, the contacts may be updated including providing recent contact data for contact application 112 (e.g., most called contacts, most recent contacts used, etc.). Contact application 112 may be inaccessible when client device 110 becomes non-operational or inaccessible, and therefore client device 120 may be used for contact retrieval.

Client device 110 may further include database 114 which may include, for example, identifiers such as operating system registry entries, cookies associated with contact application 112 and/or other applications, identifiers associated with hardware of client device 110, or other appropriate identifiers. Identifiers in database 114 may be used by a payment/service provider to associate client device 110 with a particular account maintained by the payment/service provider, such as service provider server 130. Database 114 may also further store entered and/or received contact data 116, which may be uploaded as a file or other application data to service provider server 130 for storage and retrieval when client device 110 is nonoperational or inaccessible.

Client device 110 includes at least one network interface component 118 adapted to communicate with client device 120 and/or service provider server 130 over network 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Client device 120 may be implemented using any appropriate hardware and software configured for wired and/or wireless communication with client device 110 and/or service provider server 130 for data communications, which may be utilized to by a user associated with client device 110 to lookup contacts with service provider system 130 when client device 110 is nonoperational or inaccessible. Client device 120 may correspond to an individual user, consumer, merchant, service provider, or other entity that provides access to a platform provided by service provider server 130 to lookup established contacts for users. In various embodiments, client device 120 may be implemented as a personal computer (PC), a smart phone, laptop/tablet computer, wristwatch with appropriate computer hardware resources, other type of wearable computing device, and/or other types of computing devices capable of transmitting and/or receiving data. In other embodiments, client device 120 may correspond to a device that may interact with a server, such as a stand-alone or enterprise-class servers, operating an OS such as a MICROSOFT® OS, a UNIX® OS, a LINUX® OS, or another suitable server-based OS, which may provide telephone, VoIP, VoLTE, or other communication channels to communicate with service provider server. In further embodiments, client device 120 may correspond to a public device, such a public telephone, a pay telephone, a public computing terminal, or the like. Although only one computing device is shown, a plurality of computing device may function similarly.

Client device 120 of FIG. 1 contains a contact application 122, a database 126, and a network interface component 128. Contact application 122 may correspond to executable processes, procedures, and/or applications with associated hardware. In other embodiments, client device 120 may include additional or different software as required.

Contact application 122 may correspond to one or more processes to execute modules and associated devices of client device 120 to provide a convenient interface and/or module to permit another user, such as the user associated with client device 110, to enter contact identifiers and authentication information and receive contact information from contact lookup operations of service provider server 130. In this regard, contact application 122 may correspond to specialized hardware and/or software utilized by client device 120 that may first access an IVR system, website, portal, or application interface associated with service provider server 130 for contact information retrieval. In various embodiments, contact application 122 may correspond to a general browser application configured to retrieve, present, and communicate information over the Internet (e.g., utilize resources on the World Wide Web) or a private network. For example, contact application 122 may provide a web browser, which may send and receive information over network 150, including retrieving website information, presenting the website information to the user, and/or communicating information to the website. However, in other embodiments, contact application 122 may include a dedicated application of service provider server 130 or other entity, which may be configured allow another user to enter credentials for contact lookup operations with service provider server 130 (e.g., a contact identifier and authentication information) when client device 110 becomes nonoperational or inaccessible.

In this regard, contact application 122 may be used to establish a communication channel with service provider server 130. In some embodiments, this communication channel may correspond to a telephone call over a Public Switched Telephone Network or other voice communication channel to an IVR system. In other embodiments, contact application 122 may provide network communications that may transmit data over the Internet (e.g., TCP/IP) or other wide or local area network, which may be used to communicate with service provider server 130. Such data transfers may include data transmitted over a cellular technology signal (e.g., 3G, 4G, 4G LTE, 5G, etc.). In some embodiments, this may include voice communications (e.g., VoIP, VoLTE, etc.) or may include data transfers, such as from a resident mobile application or using a web browser. Contact application 122 includes a connectivity user interface (UI) 124 to allow for entry of data. Thus, the communication channel may allow a user to enter (e.g., through keyboard, mouse, touch screen, voice, or the like) a contact identifier, and then authenticate the user using an authentication mechanism via connectivity UI 124.

Connectivity UI 124 may allow authentication through typing an access code on a keypad or keyboard, biometric authentication, voice input and sample, facial image and recognition, or the like. Thus, connectivity UI 124 may include traditional phone device input mechanisms, as well as mobile smart phone or other computing device input mechanism. Once authenticated, connectivity UI 124 may be used to browse contacts and view contact information. In some embodiments, connectivity UI 124 may allow for communicating with one or more contacts in a contact list of the user that is now authenticated on client device 120. Connectivity UI 124 may be used to initiate a phone call or message another user. Once the user utilizing client device 120 is finished, connectivity UI 124 may be wiped of data and contact application 122 may resume normal functions. Thus, connectivity UI 124 may also prevent a user from accessing other features and applications on client device 120, as well as protect the contact data and other sensitive data of a user borrowing client device 120 for contact lookup. In some embodiments, connectivity UI 124 may also be used to host or launch a virtual machine that may run an application or system image.

Client device 120 may further include database 126 which may include, for example, identifiers such as operating system registry entries, cookies associated with contact application 122 and/or other applications, identifiers associated with hardware of client device 120, or other appropriate identifiers. Identifiers in database 126 may be used by a payment/service provider to associate client device 120 with a particular account maintained by the payment/service provider, such as service provider server 130. Database 126 may include or be used to provision a cache, which may temporarily store data needed by contact application 122 during use by a different user for contact lookup. In this regard, certain data stored by database 126 or another data storage component of client device 120 may be scrubbed and wiped of data after the other user discontinues use of contact application 122 for contact lookup.

Client device 120 includes at least one network interface component 128 adapted to communicate with client device 110 and/or service provider server 130 over network 150. In various embodiments, network interface component 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 130 may be maintained, for example, by an online service provider, which may provide operations for providing contact lookup systems and operations. Various embodiments of the contact lookup system described herein may be provided by service provider server 130 and may be accessible by client device 110 and client device 120. In such embodiments, service provider server 130 may interface with client device 110 for establishing contacts to lookup when client device 110 is nonoperational or inaccessible, such as by permitting client device 120 access to the contacts once authenticated. Service provider server 130 includes one or more processing applications which may be configured to interact with client device 110 and client device 120. In one example, service provider server 130 may be provided by PAYPAL®, Inc. of San Jose, CA, USA. However, in other embodiments, service provider server 130 may be maintained by or include another type of service provider.

Service provider server 130 of FIG. 1 includes contact lookup system 140, a service provider application 132, a database 134, and a network interface component 136. Contact lookup system 140 and service provider application 132 may correspond to executable processes, procedures, and/or applications with associated hardware. In other embodiments, service provider server 130 may include additional or different modules having specialized hardware and/or software as required.

Contact lookup system 140 may correspond to one or more processes to execute modules and associated specialized hardware of service provider server 130 to provide data, operations, and processes for contact lookup services and operations based on stored contact identifiers associated with a user's contacts. In this regard, contact lookup system 140 may correspond to specialized hardware and/or software used by a user associated with client device 110 to establish an account with contact lookup system 140 and/or access another account with service provider server 130. For example, an account provided by PAYPAL® may be utilized to provide contact lookup services to users. However, a more general account (e.g., a telephone, email, mobile service provider, etc. account) may also provide the aforementioned account services when utilizing contact lookup system 140. In other embodiments, contact lookup system 140 may also or instead use contact identifiers as an account identifier without providing additional account services.

Contact lookup system 140 may correspond to a service and/or product of service provider server 130 that may be utilized by an end user to initially establish a contact identifier that the user can remember and later recall. Contact lookup system 140 may then associate the contact identifier with an identity challenge or other authentication mechanism. Contact lookup system 140 may receive the identifier from client device 110, which may store the contact identifier and request an authentication mechanism. For example, client device 110 may provide one or more user interfaces to receive the identifier and allow the user to choose an authentication mechanism, such as a password, access code, PIN, biometric fingerprint, voice response, facial recognition a security question, request for a known phrase or name, or the like. The user may then provide data to properly authenticate the user using the authentication mechanism, such as an access code, fingerprint, voice sample, answer to a question, or the like.

Once set, the user may upload, share, and/or provide permission to contacts with contact lookup system 140. In this regard, the contacts may be manually entered, where contact lookup system 140 may receive input for different contacts. Further, a permission may be provided to contacts, where contact lookup system 140 may execute an operation to access, retrieve, and/or pull the contacts from an on-device application or storage of client device 110, such as contact data 116 in database 114. In further embodiments, contact lookup system 140 may be provided an upload of a file or data structure for contact data 116 on client device 110, which may include imaging the system or application and storing an image in a container for running on a virtual machine. In some embodiments, permission may be provided by client device 110 to access and/or retrieve the contacts from a third-party platform, such as a contact management application or platform, which may then allow contact lookup system 140 to execute one or more API calls to the platform for the contacts. Contacts may be selected by the user and ordered and/or established with shortcuts and nickname identifiers for contact preferences 148. For contact preferences 148, contacts may also be grouped, such as by essential contacts, most used/called contacts, and/or recency of use according to identifications and/or metadata of the contacts or provided by the user associated with client device 110. Once the contacts are provided and/or permission to the contacts is allowed, contact data 146 and contact preferences 148 may be set for the user with the selected contact identifier and corresponding authentication mechanism.

Thereafter, client device 110 may become nonoperational or inaccessible. Thus, client device 120 may establish a communication channel with service provider server 130. The communication may be with IVR 142, which provides an IVR system and/or interface to navigate menu options and make selections via voice and/or keypad entry. This may allow input where client device 120 corresponds to a feature phone, pay phone, or the like that only has a keypad and microphone for data input. IVR 142 therefore may request input of authentication information based on the established authentication mechanism. Where the input received in response to the request is indecipherable or unable to be input (e.g., a biometric), client device 120 may request another authentication mechanism and/or challenge, or IVR 142 may switch to another after a number of incorrect or unresponsive replies. If authenticated after one or more additional challenges, IVR may retrieve contact data 146, which may be output on client device 120 through an output mechanism, such as a speaker for audio output or a user interface of an application. Contact data 146 may be output based on contact preferences 148 on client device 120, such as in an order, based on selected contacts, and/or in response to a search.

In further embodiments, application UI 144 may instead be output on client device 120 via contact application 122. Application UI 144 may correspond to output data of a user interface on client device 120 that allows for authentication of a user and thereafter contact lookup through scrolling, searching, or the like. Application UI 144 may include operations to output data via a user interface of client device 120 and receive input from one or more fields, menus, or other elements of the user interface. The input may include a contact identifier and authentication information, where contact lookup system 140 may then authenticate the user. Thereafter, application UI 144 may then output contact data 146 based on contact preferences 148 via a user interface of client device 120. The user may be permitted to scroll and/or search contact data 146, where application UI 144 may respond with corresponding user interface output data. Once IVR 142 and/or application UI 144 is complete, contact data 146 and any other information, such as a contact identifier and authentication information, may be wiped from client device 120 by contact lookup system 140.

Service provider application 132 may correspond to one or more processes to execute modules and associated specialized hardware of service provider server 130 to process a transaction and/or provide another service to end users of service provider server 130, which may include services provided with or in addition to those by contact lookup system 140. In some embodiments, service provider application 132 may correspond to specialized hardware and/or software used by a user associated with client device 110 to establish an account and/or digital wallet, which may be used to generate and provide user data for the user including contact data 146 and contact preferences 148, as well as process transactions. In various embodiments, financial information may be stored to the account, such as account/card numbers and information. A digital token for the account/wallet may be used to send and process payments, for example, through an interface provided by service provider server 130. The account may be accessed and/or used through a browser application and/or dedicated application executed by client device 110, which may include using contact lookup services provided by contact lookup system 140. Service provider application 132 may process a payment and/or transfer, which may include those payments associated with tipping or compensating a user of client device 120 by a user of client device 110 for use of client device 120. However, in other embodiments, service provider application 132 may instead provide different computing services, including social networking, microblogging, media sharing, media content streaming, messaging, video game, business and consumer platforms, etc.

Additionally, service provider server 130 includes database 134. Database 134 may store various identifiers associated with client device 110. Database 134 may also store account data, including payment instruments and authentication credentials, as well as transaction processing histories and data for processed transactions. Database 134 may store contact data 146 and/or contact preferences 148, such as when contact data 116 is uploaded to service provider server 130. However, in other embodiments, database 134 may store account and/or contact identifier information, which may be used to retrieve and output contact data 146 to client device 110.

In various embodiments, service provider server 130 includes at least one network interface component 136 adapted to communicate client device 110, client device 120, and/or another device/server for a merchant over network 150. In various embodiments, network interface component 136 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2A:
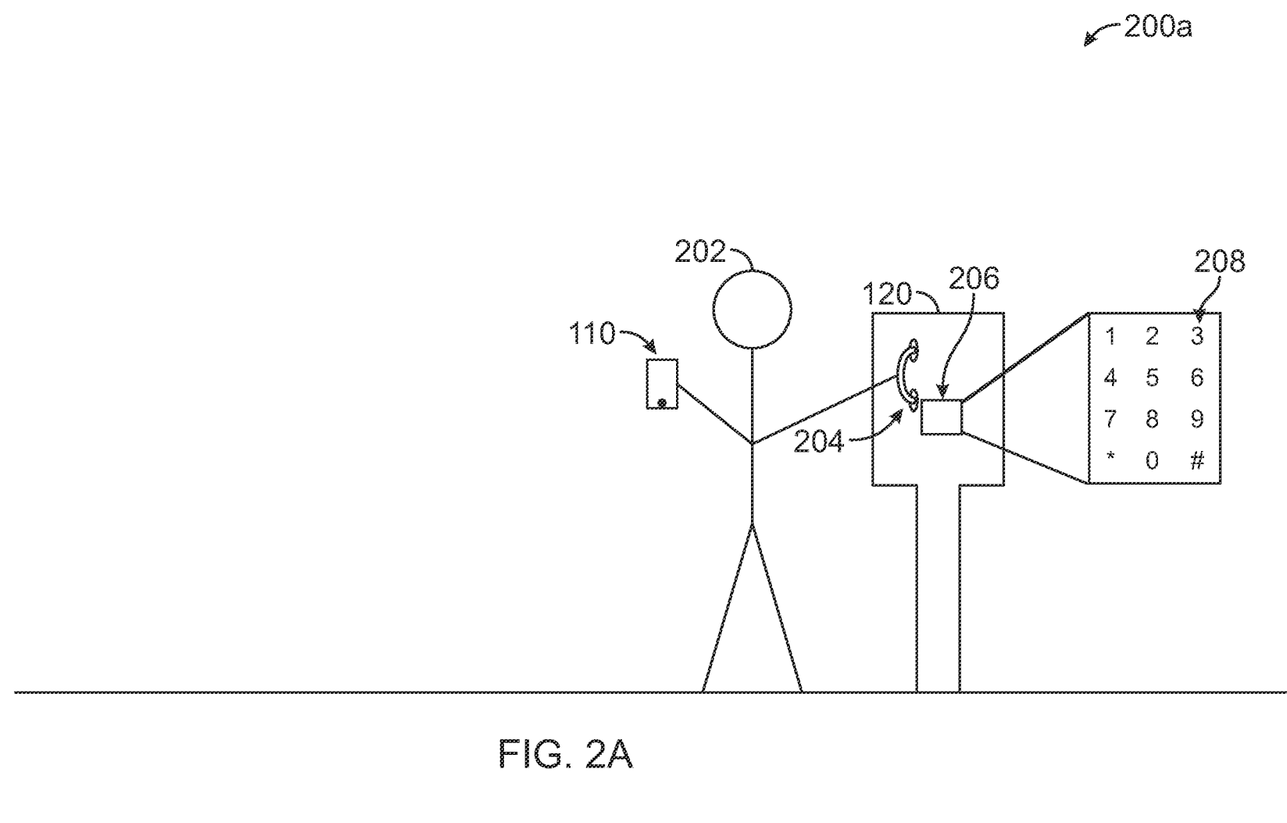
FIG. 2A is an exemplary environment having a user utilizing a public device for contact lookup operations during inoperability of a mobile device, according to an embodiment.

FIG. 2A is an exemplary environment 200a having a user utilizing a public device for contact lookup operations during inoperability of a mobile device, according to an embodiment. Environment 200a includes a user 202 that may interact with the computing systems of environment 200a, such as through client device 110 and client device 120 discussed in reference to system 100 of FIG. 1. Environment 200a may correspond to a system for providing contact lookup operations on client device 120 when client device 110 becomes nonoperational or may be inaccessible (e.g., where client device 110 is stolen or lost).

In environment 200a, user 202 may be in possession of client device 110, however, client device 110 is nonoperational. For example, client device 110 may have run out of battery power, be broken, or lack cellular or WiFi signal. In other situations, client device 110 may have been stolen or lost. User 202 may be in a situation where user 202 needs to contact another user. For example, user 202 may require transportation, money, assistance, or the like, and therefore may want or need to contact another user. In this regard, user 202 may have access to client device 120 in environment 200a. Client device 120 is shown as a pay phone in environment 200a, but other types of devices may also be used. For example, client device 120 may be a mobile smart phone in possession of another user, a phone accessible from a business, a public computing terminal, or the like.

User 202 may not know the phone number or other contact identifier of another user to contact in order to receive assistance. User 202 may approach and/or access client device 120 in order to look up a contact identifier and communicate with another user for assistance. In this regard, user 202 may pick up phone receiver 204 from client device 120 and use keypad 206 to call a known number that allows user 202 to look up and identify their contacts. The known number may be a general service number of a service provider, such as a toll-free (e.g., starting with 800) number or the like, that allows user 202 to navigate menus and request assistance. The number may also be particular to a contact lookup system of the service provider to directly access an IVR system for contact lookup. However, user 202 may also utilize their own number, where one or more keypad or voice inputs provided at a point during the phone call (e.g., at the end of a voicemail message) may allow user 202 to access and move to the IVR system for contact lookup.

Once the IVR system is accessed, user 202 may then use keypad 206 and/or voice inputs to navigate the IVR system. For example, the IVR system may first request a contact identifier for user 202 that allows for contact lookup. This contact identifier may be user 202's own phone number or another identifier that is associated with the contact (e.g., spelling a name using input keys 208 for keypad 206). User 202 may utilize input keys 208 to enter the identifier. Next, an identity challenge may follow, such as a request for authentication information based on an authentication mechanism. Using the pay phone for client device 120 in environment 200a, user 202 may attempt to provide either a voice sample or response, or instead type an access code. In some embodiments, such as if user 202 is in a busy or loud area, providing a voice sample may be difficult or undesirable (e.g., if the voice sample is undecipherable or others may eavesdrop). Thus, user 202 may instead enter an access code via input keys 208. Further, if client device 120 supports other input mechanisms, another authentication mechanism may be used.

After authentication, client device 120 may provide output via phone receiver 204. This may include an audio output of user 202's contacts. User 202 may scroll and/or search through the contacts using voice input and/or input keys 208. The contacts may be output based on preferences, such as an order or importance of the contacts. In some embodiments, the contacts may be selected based on a location of user 202, such as a closest contact to user 202. However, other data may be used, such as a most often called or most recently called parameter to determine one or more contacts to output to user 202. In some embodiments, client device 120 may also include a display component, which may allow display and/or scrolling through available contacts. Once user 202 is satisfied or otherwise completed use of a communication, user 202 may end use of client device 120, at which point any data used by user 202 during the contact lookup operations may be wiped.

Figure 2B:
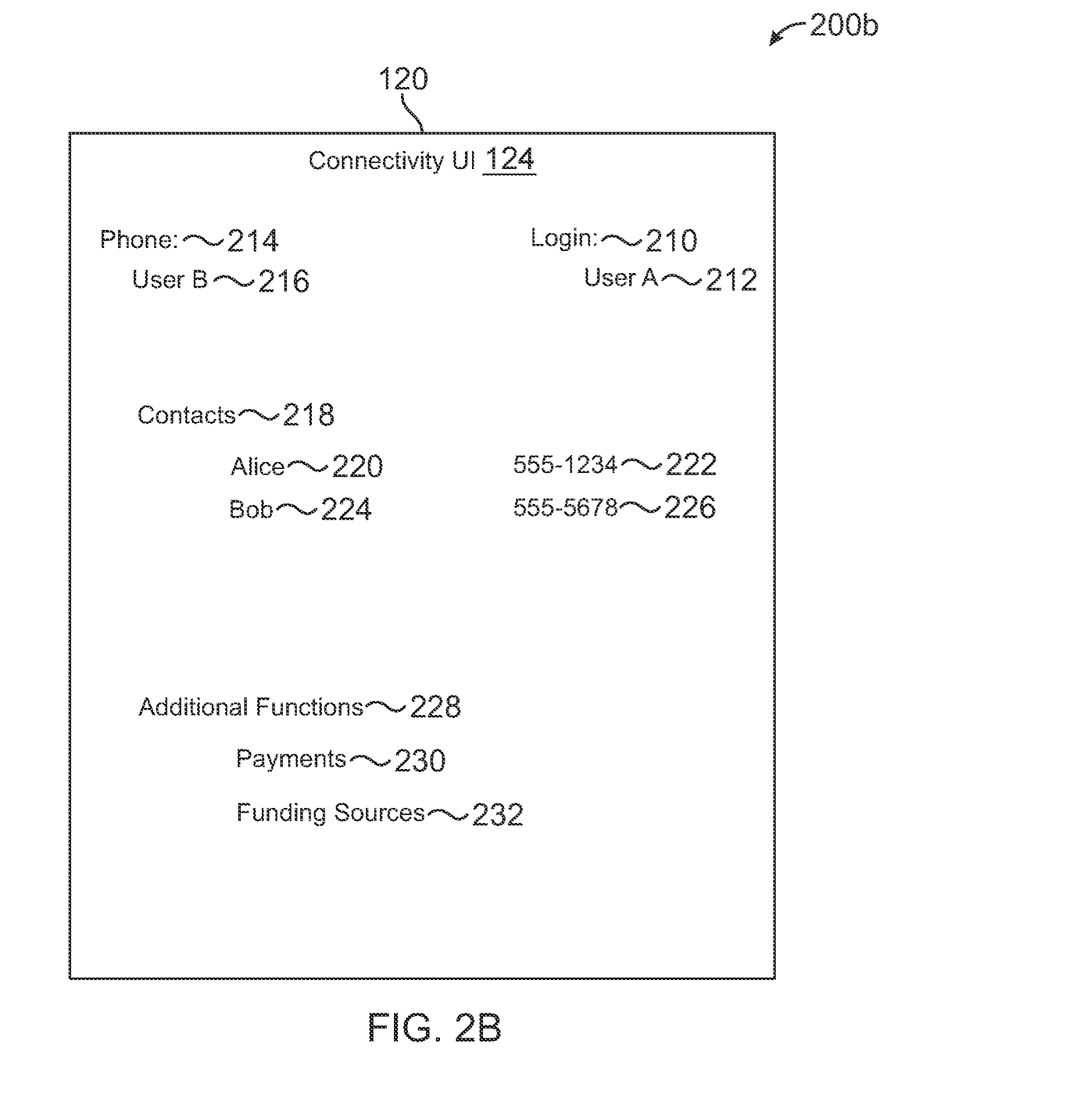
FIG. 2B is an exemplary user interface displaying contact lookup operations after authentication on a foreign computing device, according to an embodiment.

FIG. 2B is an exemplary user interface 200b displaying contact lookup operations after authentication on a foreign computing device, according to an embodiment. User interface 200b of FIG. 2B may be displayed by client device 120 discussed in reference to system 100 of FIG. 1. In this regard, client device 120 includes user interface 200b of an application that may access and display contacts from a user after the user authenticates for contact lookup system 140 in system 100.

User interface 200b on client device 120 includes connectivity UI 124 from contact application 122 on client device 120. In this regard, connectivity UI 124 may be displayed in response to a user A 212 different from an owner (a user B 216) for client device 120 requesting use of client device 120 for contact lookup. In some embodiments, connectivity UI 124 may be pulled up by user B 216 of client device 120 when providing client device 120 to the other, borrowing, user A 212, which may allow contact application 122 to prevent access to other applications and functions of client device 120 while connectivity UI 124 is displayed. In this regard, user B 216 may then be required to log back in to client device 110 and/or contact application 122 to restore functionality.

Connectivity UI 124 may include a login field 210, where user A 212 may enter login credentials for a contact lookup system. The login credentials entered to login field 210 may include a contact identifier and authentication information. The authentication information may be in response to an authentication mechanism or request for an identity challenge, such as a password, access code, PIN, biometric fingerprint, voice response, facial recognition, security question, request for a phrase or name, or the like. Once logged in, connectivity UI 124 may display a phone identifier 214 for user B 216, which allows identification of client device 120 as belonging to user B 216. In this regard, phone identifier 214 may be used as a security mechanism to show that client device 120 is not owned by user A 212 if stolen or misappropriated and may also allow user B 216 to regain control of client device 120 after use by user A 212.

After authentication, contacts 218 may be displayed from data stored by a service provider and any preferences that user A 212 may have for data display, such as a condensed version of emergency or important contacts, a preset order of contacts, shortcuts or nicknames for contacts, and the like. In some embodiments, contacts 218 may also include a search and/or scroll field to allow user A 212 to locate a particular contact. Contacts 218 are shown with contact Alice 220 having phone number 222 and contact Bob 224 having phone number 226. Thus, user A 212 is shown available contacts which user A 212 may record and/or contact. Selection of phone number 222 and/or phone number 226 may initiate a phone call or text message to their respective contact, which may be approved on client device 120 or barred. Similarly, selection of contact Alice 220 and/or contact Bob 224 may allow for messaging, emailing, or the like to their respective contact, which may require approval, be approved, or be barred on client device 120.

In some embodiments, connectivity UI 124 may further include container data for an application or system image of a device for user A 212. The data may allow output, via a virtual machine, for functionalities of the device for user A 212. This may allow for additional functions 228 to be displayed in connectivity UI 124. Use of these functions may enable user A 212 to access additional services from the applications and functions of their device. For example, additional functions 228 is shown with a transaction processing and/or payment functions having a payments option 230 using funding sources 232. This may allow user A 212 to provide payments via user B 216's client device 120. Once user A 212 is finished with use of client device 120, user A 212 may log out or hand back client device 120 to user B 216. At this point, use of connectivity UI 124 by user A 212 may be detected as complete, and the data for or associated with connectivity UI 124 may be wiped on client device 120.

Figure 3:
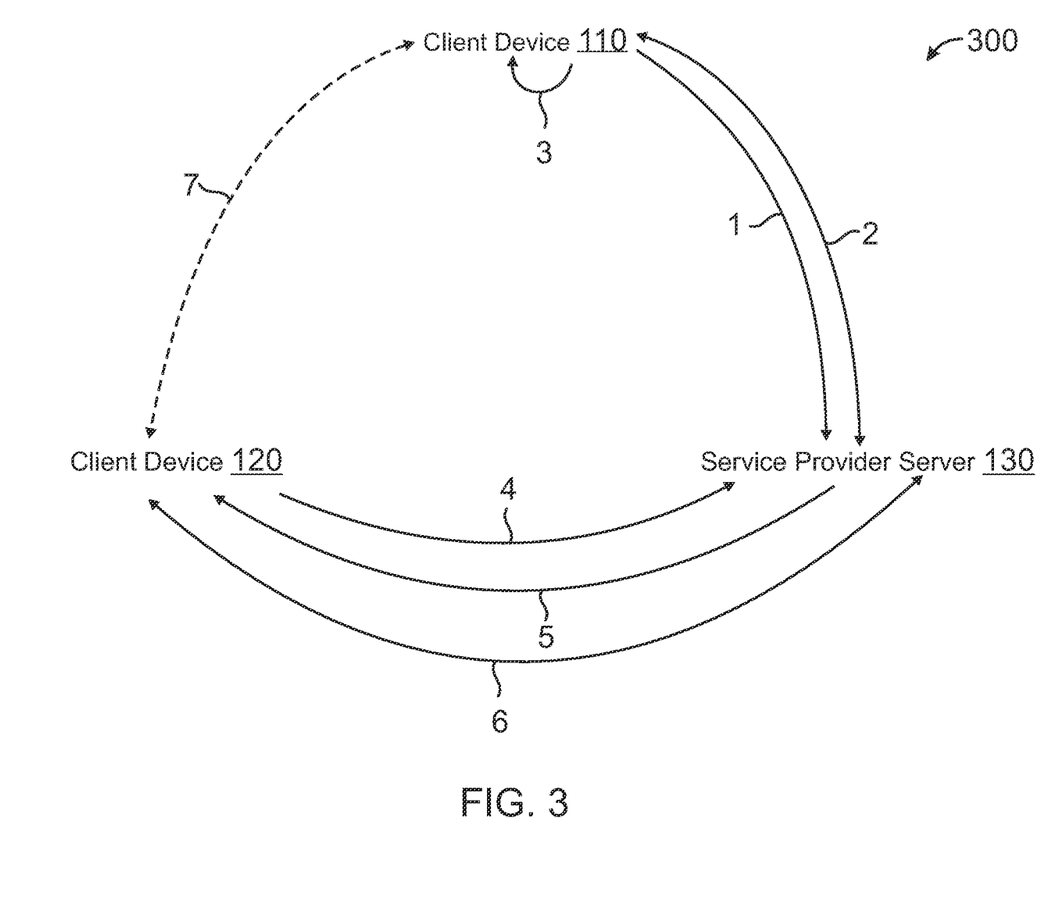
FIG. 3 is exemplary system environment of exemplary interactions between computing systems when providing contact lookup operations on a foreign device during inoperability of a known device, according to an embodiment.

FIG. 3 is exemplary system environment 300 of exemplary interactions between computing systems when providing contact lookup operations on a foreign device during inoperability of a known device, according to an embodiment. System environment 300 includes client device 110, client device 120, and service provider server 130 discussed in reference to system 100 of FIG. 1. System environment 300 may correspond to a system for providing contact lookup when client device 110 fails or is unavailable, which are provided through interactions with client device 120.

In system environment 300, at interaction 1, client device 110 requests establishment of a contact identifier and authentication mechanism to provide secure contact retrieval when client device 110 is nonoperational or inaccessible. In this regard, client device 110 may access a website, application, or portal that allows establishment of the information for contact lookup and retrieval. At interaction 2, service provider server 130 requests, and client device 110 responds with information necessary to establish contact information and authentication required to access the contact information. For example, during a setup stage, client device may provide a contact identifier and authentication information necessary to respond to an identity challenge or other authentication mechanism. Once confirmed valid and secure, client device 110 provides contacts to service provider server 130. This may be done through manual entry and/or uploading a file or data to service provider server 130, as well as granting permission for service provider server 130 access and retrieve such data on client device 110.

In some embodiments, a third-party contact management platform may store contacts relevant and/or useful to client device 110. Client device 110 may provide permission or approval to obtain such data by service provider server 130. Thereafter, service provider server 130 may execute one or more API calls to the third-party platform to request the data, which may be securely negotiated and transmitted to the service provider server 130. Client device 110 may perform any pruning, reordering, and/or grouping of contacts, as well as establishing shortcuts and/or nicknames (e.g., "emergency," "wife," etc.) to contacts for ease of use.

Once the contacts are stored by service provider server 130, client device 110 may have set their contact lookup account and features with service provider server 130. At a later time for interaction 3, client device fails or is unavailable. This may occur when client device 110 becomes broken, is lost or stolen, loses electronic communication means, such as due to a diminished or lost WiFi or cellar connection or insufficient battery to maintain operation. To access their stored contacts, the user of client device 110 requests usage of client device 120. At interaction 4, client device 120 requests access to the contacts from service provider server 130. Requesting access may include accessing an IVR system, utilizing a mobile application, and/or accessing a website for service provider server 130's contact lookup system. At interaction 5, service provider server 130 returns with a request for authentication. This may include outputting an interface via the communication channel used to access the contact lookup system. The interface may request entry of the contact identifier established by client device 110 from client device 120, as well as executing an identity challenge or other authentication mechanism. Further, service provider server 130 may run additional risk checks, such as a last known location for client device 110 against a location for client device 120, a risk check on client device 120 and/or a known location or IP address of client device 120, whether client device 120 is a known malicious device, and the like.

At interaction 6, client device 120 responds with the contact identifier and authentication information. If valid and authenticated, at interaction 6, service provider server 130 shares the contact information with client device 120. Where an IVR system is used, the contact information may be provided in audio form, as discussed in reference to FIG. 2A. Where an application and/or website is used, the contact information may be output through one or more user interfaces and/or a display component, as discussed in reference to FIG. 2B. Thereafter, the user may utilize client device 120 to obtain, browse, and/or search the contact information. In some embodiments, client device 120 may also be used to communicate with a contact. Once complete, service provider server 130 and/or an on-device operation of client device 120 may wipe any used data for the contact lookup system from client device 120. Thereafter, at an optional interaction 7, once client device 110 is operational again, the user of client device 110 may provide reimbursement, compensation, a tip, or the like to client device 120. Thus, service provider server 130 may facilitate processing a transaction or transfer between client device 110 and client device 120.

In some embodiments, client devices 110/120 may also utilize one or more cloud storage components for storage and/or search of contact information. In such embodiments, client devices 10/120 and/or service provider server 130 may interact with one or more other devices, servers, and/or components for fetching of all or a partial amount of the contact information necessary for output. Such contact information may then generally be available from a "cloud" of distributed computing components that are accessible and/or for use in temporarily or permanently downloading contact data to a user's device, such as client devices 110/120. Thus, the data may be accessible for downloading onto a user's personal phone (e.g., client devices 110/120 or another new device), but this process may only be accessible temporarily on a foreign device for a limited use (e.g., limited by time, location, user authentication and/or biometric identification, and the like).

Figure 4:
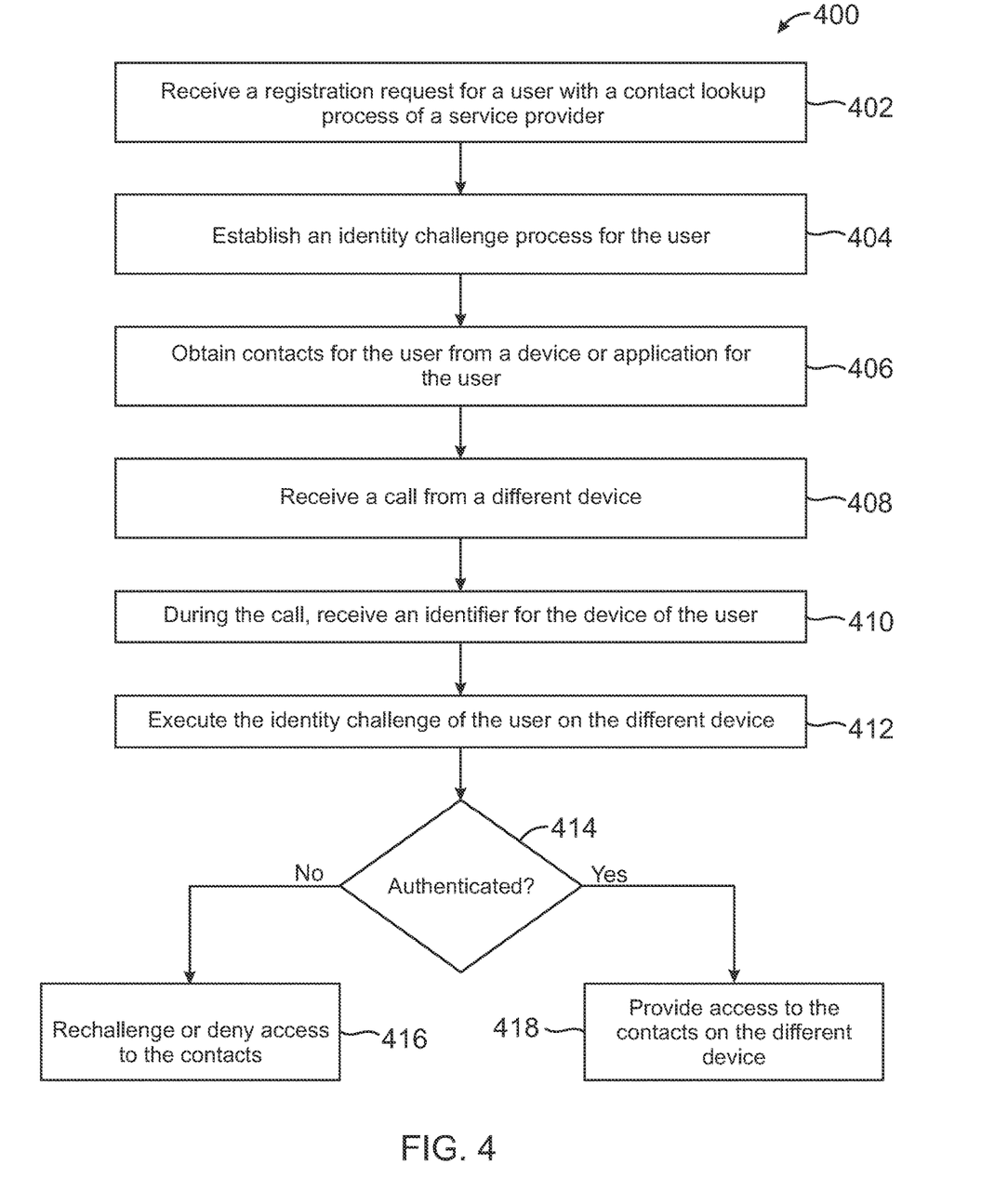
FIG. 4 is a flowchart for contact lookup operations during inoperability of mobile devices, according to an embodiment.

FIG. 4 is a flowchart 400 for contact lookup operations during inoperability of mobile devices, according to an embodiment. Note that one or more steps, processes, and methods described herein of flowchart 400 may be omitted, performed in a different sequence, or combined as desired or appropriate.

At step 402 of flowchart 400, a registration request for a user with a contact lookup process of a service provider is received. The user may provide the registration request via an IVR system, device application, or website by accessing a portal of the service provider. This may be done from a computing device of the user, which may include a contact list and/or contact management application and data. However, other devices may also be used (e.g., a home or work personal computer). When submitting the registration request, the user may further provide a contact identifier for the user and/or the user's device, such as a phone number or other memorable information that identifies the user to the service provider.

At step 404, an identity challenge process for the user is established. The identity challenge process may correspond to a process to confirm an identity of the user, such as through an authentication mechanism. With the identity challenge process, the user may also provide the necessary information to pass the identity challenge and verify the user's identity and/or authenticate the user. The user may provide multiple types of responses to different challenges, such as an access code, answers to security questions, biometric, and voice samples or phrases. This may allow the user to be authenticated on multiple different types of devices and through different mechanisms.

At step 406, contacts for the user are obtained from a device or application for the user. For example, the user may provide manual input of individual contacts and their corresponding information. If the user would like multiple contacts, to expedite the process, the user may update a file or data for their contacts, such as an exportable XML, or DOC file with the user's contacts. The user may also permit the service provider to have access to a device application or a third-party platform having the user's contacts. In such embodiments, the service provider may utilize one or more APIs, calls, and/or integrations in order to obtain the contact data for the user. Once obtained, the user may then finalize contact profile setup by arranging and/or pruning their contacts.

At step 408, the service provider may receive a call from a different device. The call may be received from a foreign device not identified by the service provider. However, where the foreign device also is associated with an account, the service provider may provide an option (e.g., through an IVR menu) to enter a contact recovery or retrieval process for another user having a different phone number or contact address. Additionally, other communication channels may be used, such as network communications received from a device over an Ethernet connection, DSL, cellular technology signaling, or other communication signaling and channel. Thus, the communications may result from accessing a website and/or using a mobile application on a device.

At step 410, during the call, an identifier is received for the device of the user. The identifier may correspond to the contact identifier of the user and may be used for retrieval of the identity challenge and the contact of the user. Thus, at step 412, the identity challenge of the user is executed on the different device. This may include repeating back a challenge question and requesting voice or text input, requesting entry of an access code, requiring a biometric, and the like. If the user is unable to provide input to respond to the identity challenge, another identity challenge may be used, such as one that may correspond to the input characteristics of the different device participating in the call. When the user has properly provided a response to the identity challenge, at step 414, it is determined whether the user is authenticated.

If the user is not authenticated at step 416, the user may be re-challenged or denied access to the contacts. Multiple challenges, as well as different authentication mechanisms, may be executed for a set number of times and/or if the initial response to the identity challenge is indecipherable (e.g., too much background noise or too loud for voice authentication) and/or if the different device participating in the call is unable to provide the requested input. Thus, after a certain number of failures, permission to the contacts may be denied. However, if authenticated at step 418, access to the contact may be provided on the other device. The access may allow the different device to receive, search, and/or otherwise browse through contacts for the user logged in to the contact lookup system and operations. The access may also allow the different device to be used to contact one or more of the contacts. Additionally, once use is finished, the different device may be scrubbed and wiped of data used for the contact lookup.

Figure 5:
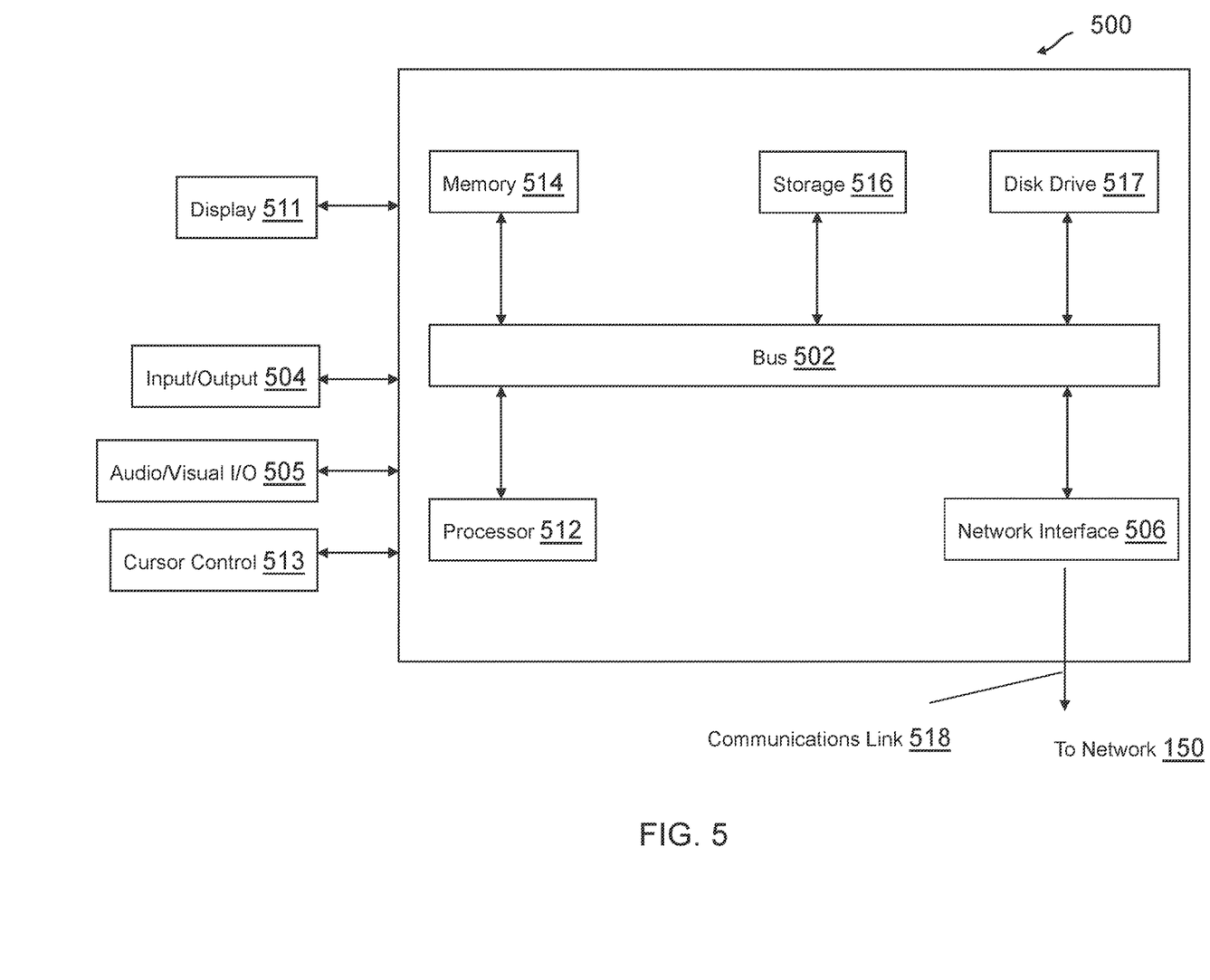
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, images, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. For example, while the description focuses on gift cards, other types of funding sources that can be used to fund a transaction and provide additional value for their purchase are also within the scope of various embodiments of the invention. Thus, the present disclosure is limited only by the claims.

What is claimed is:

1. A service provider system comprising:
a non-transitory memory; and
one or more hardware processors coupled to the non-transitory memory and configured to read instructions from the non-transitory memory to cause the service provider system to perform operations comprising:
receiving a phone call from a first phone device to a first phone number associated with an interactive voice response (IVR) system of the service provider system;
receiving, from the first phone device during the phone call, a second phone number for a second phone device of a user;
performing a contact lookup process using the second phone number;
determining an account of the user from the contact lookup process;
performing an identity challenge of the user for the account during the phone call using the IVR system;
receiving a response to the identity challenge during the phone call;
determining that the user passed the identity challenge based on the response;
determining, in response to the user passing the identity challenge, a user contact of the user using the contact lookup process; and
providing an access to the user contact via the IVR system.

2. The service provider system of claim 1, wherein the performing the identity challenge comprises requesting an access code by the IVR system from the user via a phone keypad of the first phone device.

3. The service provider system of claim 2, wherein prior to the receiving the phone call, the operations further comprise:
receiving a plurality of contacts of the user while the user is logged into the account, wherein each of the plurality of contacts comprises at least a phone number, an email address, or an account identifier;
receiving the access code for the identity challenge from the user while the user is logged into the account; and
storing the plurality of contacts and the access code with the account.

4. The service provider system of claim 3, wherein the plurality of contacts comprises a subset of contacts within a contact list application on the second phone device, and wherein the operations further comprise:
receiving an order to an output of the plurality of contacts via the IVR system from the user while the user is logged into the account; and
registering the order to the output of the plurality of contacts with the IVR system.

5. The service provider system of claim 3, wherein the receiving the plurality of contacts comprises:
tracing the plurality of contacts via an application programming interface (API) of an additional service provider that provides contact list data for at least the plurality of contacts; and
receiving a selection of the plurality of contacts for the IVR system from the contact list data.

6. The service provider system of claim 1, wherein prior to the providing the access to the user contact, the operations further comprise:
receiving an input of a name associated with the user contact from the first phone device.

7. The service provider system of claim 1, wherein prior to the providing the access to the user contact, the operations further comprise:
selecting the user contact from a plurality of contacts based on a recency of a use of the user contact by the second phone device.

8. The service provider system of claim 1, wherein the operations further comprise:
providing a graphical user interface (GUI) on the first phone device in response to determining that the user passed the identity challenge on the first phone device;
displaying the user contact via the GUI;
detecting that the phone call has ended between the first phone device and the IVR system; and
scrubbing the response to the identity challenge and the user contact from the first phone device.

9. The service provider system of claim 1, wherein the identity challenge comprises one of a voice authentication request or a fingerprint biometric request during the phone call.

10. The service provider system of claim 9, wherein prior to the receiving the response to the identity challenge, the operations further comprise:
receiving an input from the user after performing the identity challenge;
determining that the input is indecipherable during the phone call; and
prompting the user for an access code associated with the identity challenge based on determining that the input is unclear or unable to be provided.

11. The service provider system of claim 1, wherein the phone call is received via one of a rich Internet application or mobile application software for a service provider associated with the service provider system, and wherein the IVR system provides the access to the user contact as a voice data output during the phone call.

12. A method comprising:
receiving, by a service provider server, a device identifier for a first mobile device from a mobile application on a second mobile device;
determining, by the service provider server, an account associated with the device identifier;
requesting, by the service provider server, an authentication information for the account from the second mobile device via the mobile application;
receiving, by the service provider server, the authentication information from the second mobile device via the mobile application;
determining, by the service provider server, at least one user contact associated with the account based on the authentication information; and
causing to be displayed, an instance of a user interface of the mobile application on the second mobile device by the service provider server, the at least one user contact while the account is authenticated in the mobile application on the second mobile device.

13. The method of claim 12, wherein the device identifier comprises a phone number of the first mobile device, a name associated with the phone number, or an account identifier associated with the account and the first mobile device.

14. The method of claim 12, wherein the mobile application comprises a contact list application or a transaction processing application.

15. The method of claim 14, further comprising:
providing transaction processing using the account on the second mobile device via the transaction processing application while the account is authenticated in the transaction processing application on the second mobile device.

16. The method of claim 12, wherein prior to the receiving the device identifier, the method further comprises:
receiving a registration request of the at least one user contact with the account from the first mobile device when the first mobile device is logged into the account;
requesting, based on the registration request, a selection of the authentication information for an access to the at least one user contact on one or more computing devices different than the first mobile device;
receiving the selection of the authentication information; and
registering, with the account based on the registration request, the at least one user contact and the authentication information for the access to the at least one user contact.

17. The method of claim 12, further comprising:
providing a search function for the at least one user contact via the mobile application;
receiving a name associated with a corresponding one of the at least one user contact;
displaying the corresponding one of the at least one user contact based on the name;
detecting one of a logout of the account or an exit of the mobile application on the second mobile device; and
wiping the authentication information and the corresponding one of the at least one user contact from the second mobile device.

18. The method of claim 12, wherein the authentication information comprises an alphanumeric code, a fingerprint biometric, or a voice biometric.

19. A non-transitory machine-readable medium having stored thereon machine-readable instructions executable to cause a machine to perform operations comprising:
receiving an identifier associated with at least one of a first mobile device of a first user or an account of the first user, wherein the identifier is received from an application executing on a second mobile device, and wherein the second mobile device is associated with a second user;
requesting an authentication of the first user via the application executing on the second mobile device;
receiving the authentication of the first user;
determining a system image of a state of the first mobile device based on the identifier and the authentication of the first user; and
causing the system image of the state of the first mobile device to be output on the second mobile device via a virtual machine executing on the second mobile device or a cloud computing environment accessible to the second mobile device via the application.

20. The non-transitory machine-readable medium of claim 19, wherein the operations further comprise:
receiving a request to end an output on the second mobile device of the system image of the state of the first mobile device;
removing the system image from the output on the second mobile device; and
wiping data associated with the system image and a usage of the system image on the second mobile device.

* * * * *